July 24, 1951  H. J. MATHIEU  2,562,054

SINKER RELEASE FOR FISHING TACKLE

Filed March 30, 1948

INVENTOR
HARRY J. MATHIEU
BY Oswald H. Milmore
HIS ATTORNEY

Patented July 24, 1951

2,562,054

UNITED STATES PATENT OFFICE 2,562,054

SINKER RELEASE FOR FISHING TACKLE

Harry J. Mathieu, Oakland, Calif., assignor to Manuel S. Freitas, Oakland, Calif.

Application March 30, 1948, Serial No. 17,927

2 Claims. (Cl. 43—43.12)

This invention relates to a fishing tackle, and is concerned particularly with a device for supporting a sinker near the end of a fishing line which is adapted to release or detach the sinker automatically when a fish makes a bite or strike. Such devices are interposed between the fish line and the leader, hook or hooks, and are known among fishermen as sinker releases.

Sinker releases are already known wherein a spring-pressed, reciprocable pin, mounted within a casing, extends through the loop or eye of the sinker or of the cord or wire from which the sinker is suspended. An example is illustrated in U. S. Patent No. 1,296,370. Such devices, however, have closely fitting parts, and are expensive to manufacture, particularly if they are properly constructed for reliable operation.

It is an object of the present invention to provide an improved sinker release which is constructed of few parts of simple shapes, which are readily assembled without expensive or precision work.

Another object is to provide an improved sinker release wherein the reciprocable securing pin is laterally offset from the axis of the housing, i. e., near the side wall, to facilitate engaging a sinker support, and permitting attachment of a heavier sinker support without weakening the housing by cutting a large slot into its wall. Ancillary thereto, it is an object to provide a sinker release wherein the reciprocating pin is bifurcated and the tips are spread apart to provide lateral guides engaging the inner walls of the housing.

A further object is to provide an improved sinker release wherein the reciprocable element for engaging the sinker or sinker supporting element, is provided at one end with an eye or loop for securing the leader or fish hook and is, further, bent to form an abutment for the actuating spring, whereby the need for various accessories on this pin is obviated.

Other objects will become evident from the following description, made with reference to the drawing forming a part of this specification and illustrating one preferred embodiment of the invention, wherein.

Figure 1:
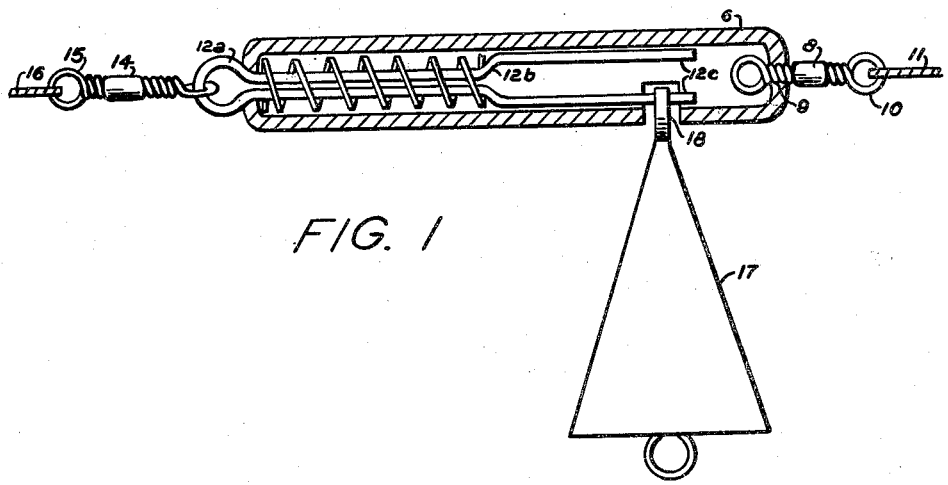
Fig. 1 is a longitudinal, sectional view of my sinker release in its normal position with the sinker supported thereby.
Figure 2:
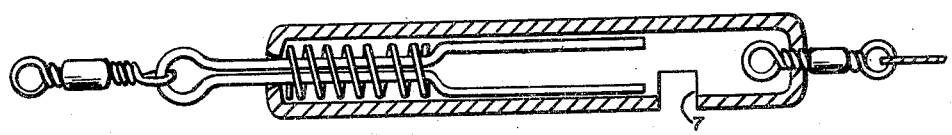
Fig. 2 is a similar view showing the device in a position for releasing the sinker.

Referring first to Figs. 1 and 2, illustrating the completed sinker release, the device comprises a tubular housing 6 having a transverse slot 7 near the "head" end, i. e., the right end as shown in Fig. 1. A swivel 8 is fixed to the end wall of the housing by a coiled wire stud 9 and carries an eye 10 to which a fishing line 11 may be attached. The opposite end wall of the housing, i. e., the "tail" end, away from the fishing line, has an opening within which a securing pin 12 is reciprocably mounted. The securing pin is bifurcated and formed of a single, elongated piece, having an eye or loop 12a at its outer end and having its prongs bent outwardly at 12b, some distance from the forward ends of the prongs, so as to provide a seat or shoulders for the forward end of actuating spring 13, the rear or tail end of which abuts the tail end wall of the housing. The portion of the pin to the rear of the lateral portions 12b forms a guide for the spring 13. Forwardly of the lateral portions 12b the prongs extend parallel to the axis of the housing 6 to provide straight tip portions 12c. By providing two tips 12c the securing pin is readily centered within the tubular housing; further, the double seat 12b insures operation without binding. By forming the tip sections 12c laterally off-center from the housing axis I am able to use a smaller housing for handling a given size of sinker support and facilitate passage of the tip through the eye of the sinker support. A second swivel 14 having an eye 15 may be secured to loop 12a for attachment of a leader 16 carrying one or more fish hooks (not shown).

By pulling the securing pin 12 toward the tail end and compressing spring 13 to the position shown in Fig. 2, the prongs of the pin are retracted beyond the slot 7 and the eye or loop of a sinker-supporting cord or wire can be introduced. Thus, the sinker 17 may have a rigid wire support 18, although the sinker release may likewise be used with flexible supports, which may be longer than the leaders. When the pin 12 is released the spring 13, bearing against the abutments 12b, moves the pin to its inward position, toward the head end, causing one of the prongs to pass through the eye of the support 18, and securing the sinker as shown in Fig. 1. The prongs are long enough to extend beyond the slot 7 when in their normal position, thereby affording a firm support for the sinker.

When the sinker release is suspended from the fishing line 11 it will not release the sinker upon jerks on the line 11 because the inertia of the leader 16 and hooks thereon will not suffice to retract the pin against the spring 13. When, however, a fish strikes or makes a bite and exerts a considerable tug on the leader the pin will be pulled toward the tail end to the position shown in Fig. 2. The sinker will thereupon drop from the slot 7, permitting the fisherman to play the fish and bring it in with a light rod without the weight and encumbrance of the sinker.

Figure 3:
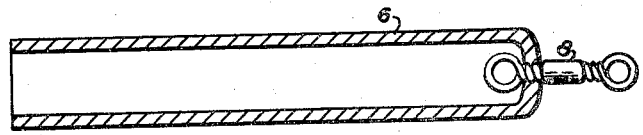
Figs. 3, 4 and 5 are views showing the component parts in successive stages of manufacture.

My sinker release may be fabricated as follows: A short piece of tubing 6 of workable material, such as copper or brass, open at both ends, is first assembled to the stud 9 and the head end wall of the housing is formed by crimping or spinning. I prefer to use a spinning operation to bend the metal for forming the end wall and securing the stud 9 so as to force the tube metal firmly into the spaces between the turns of the coiled wire stud 9 as shown, whereby the stud is embedded in the end wall. At the completion of the first step the parts are as shown in Fig. 3.

The slot 7 is next cut into the wall of the tube 6. This cut may, if desired, precede the previous step.

Figure 4:
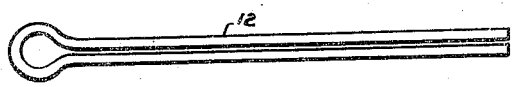
Figure 5:

A swivel 14 is next attached to a bifurcated pin 12 by sliding its eye or loop between the prongs and out to the pin loop 12a. Next, the coil spring 13 is slid over the prongs of the pin. The pin, initially and during the assembly to the swivel and spring, has the form shown in Fig. 4, and may be an ordinary cotter pin, preferably one of corrosion-resistant metal, such as copper, brass, and the like. After the spring is in place the prongs are bent laterally outwardly at 12b and the tips are bent forwardly at 12c to assume the shape shown in Fig. 5. The spacing between the outer edges of the parallel tips 12c is such as to permit free movement within the tube 6 with a small clearance.

The pin, swivel and spring assembly is then introduced into the open, tail end of the previously prepared tube 6 and the end of the tube is crimped or spun about the closed portion of the pin with the spring 13 inside the tube. A central opening of sufficient size to permit free reciprocation of the pin is left in the end wall formed by this operation. The completed sinker release then has the form shown in Fig. 1.

The method of making the sinker release is claimed in divisional application Ser. No. 209,131 filed February 2, 1951.

I claim as my invention:

1. A sinker release comprising an elongated casing having an opening in its side adapted to receive a sinker support and an abutment structure located in spaced relation to the opening toward one end of the casing and provided with an opening through the abutment structure; means for securing a fishing line to the casing; a reciprocable securing pin at least partly within the casing having a part thereof protruding outwardly through said opening in the abutment structure, said protruding part having means for securing a leader thereto and being shaped to engage the outer side of said abutment structure to constitute a stop limiting movement of the pin in an inward direction; and a spring within the casing abutting the inner side of said abutment structure and normally urging said pin to an inward position, said pin constituting a spring guide and extending through the spring and having two arms, each arm having a lateral bend at the inner end of the spring to provide a spring abutment and at least one of said arms having a forward extension to provide a tip extending off-center from the longitudinal axis of the casing forwardly across said said opening to secure said sinker support when the tip is in its forward position, the length of said tip being such that the tip may be retracted from said side opening when the spring is compressed.

2. A sinker release comprising a tubular housing having head and tail walls and a transverse slot in the side of the housing adapted to receive a sinker support; means for securing a fishing line to the head wall; a reciprocable securing pin partly within said housing and extending outwardly through an opening in the tail wall; and a spring within said housing abutting said tail wall and normally urging said pin to an inward position, said pin being formed of a single, elongated piece having a fold to provide two arms and an eye and constituting a spring guide extending through the spring substantially coaxially with said housing, each arm having a lateral bend to provide a spring seat and a forward extension to provide a tip extending off-center from the axis of the pin and forwardly across said slot to secure said sinker support when the pin is in its forward position, the length of said tip being such that the tip may be retracted away from said slot when the spring is compressed.

HARRY J. MATHIEU.

REFERENCES CITED

The following references are of record in the file of this patent:

UNITED STATES PATENTS

| Number | Name | Date |
| --- | --- | --- |
| 1,296,370 | Darling | Mar. 4, 1919 |
| 1,508,612 | Potter | Sept. 16, 1924 |
| 2,038,127 | Pflueger | Apr. 21, 1936 |
| 2,275,253 | Eger | Mar. 3, 1942 |
| 2,322,536 | Miller | June 22, 1943 |
| 2,359,588 | Shea | Oct. 3, 1944 |